(12) United States Patent
Sheng et al.

(10) Patent No.: US 12,368,505 B2
(45) Date of Patent: Jul. 22, 2025

(54) INTER-LAYER LINK DESIGN METHOD OF MULTILAYER CONSTELLATIONS WITH ENHANCED SERVICE COVERAGE CAPABILITY

(71) Applicant: Xidian University, Xi'an (CN)

(72) Inventors: Min Sheng, Xi'an (CN); Qi Hao, Xi'an (CN); Di Zhou, Xi'an (CN); Weigang Bai, Xi'an (CN); Jiandong Li, Xi'an (CN); Yan Shi, Xi'an (CN); Haoran Li, Xi'an (CN)

(73) Assignee: Xidian University, Xi'an (CN)

( * ) Notice: Subject to any disclaimer, the term of this patent is extended or adjusted under 35 U.S.C. 154(b) by 49 days.

(21) Appl. No.: 18/431,985

(22) Filed: Feb. 4, 2024

(65) Prior Publication Data

US 2024/0283529 A1 Aug. 22, 2024

(30) Foreign Application Priority Data

Feb. 20, 2023 (CN) .......................... 202310142234.9

(51) Int. Cl.
*H04B 7/185* (2006.01)
*H04L 27/34* (2006.01)

(52) U.S. Cl.
CPC ..... *H04B 7/18584* (2013.01); *H04B 7/18563* (2013.01); *H04L 27/3488* (2013.01)

(58) Field of Classification Search
CPC ............ H04B 7/18584; H04B 7/18563; H04L 27/3488
USPC ......................................................... 375/262
See application file for complete search history.

(56) References Cited

FOREIGN PATENT DOCUMENTS

CN 201910151944 A * 9/2020 ......... H04B 7/18521

* cited by examiner

*Primary Examiner* — Dominic D Saltarelli
(74) *Attorney, Agent, or Firm* — Hemisphere Law, PLLC; Zhigang Ma

(57) ABSTRACT

An inter-layer link design method of multilayer constellations with enhanced service coverage capacity is provided, the method includes: establishing a multilayer satellite network spinning T time slot, and obtaining a coordinate of each satellite in the multilayer satellite network at each time slot under a geocentric coordinate system; establishing an adjacency matrix of each constellation in the multilayer satellite network; establishing a feasible set of inter-layer links between adjacent layers in the multilayer satellite network for each time slot; establishing a globally non-uniform service model according to geographical population distribution, and dividing an earth surface into multiple logical area; obtaining a weight of inter-layer link in the feasible set of inter-layer links at each time slot; establishing an assignment model of inter-layer link according to the weight of inter-layer link; and optimizing an inter-layer link set in the feasible set of inter-layer links to obtain a target inter-layer link set.

10 Claims, 3 Drawing Sheets

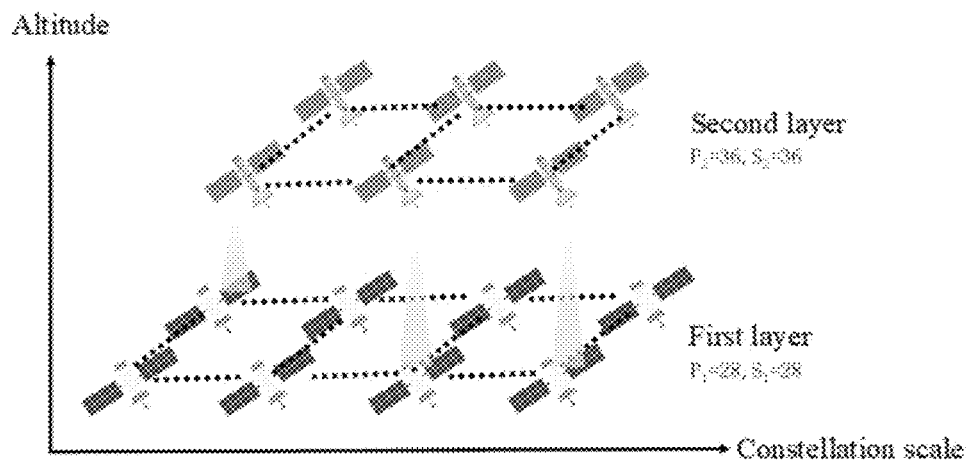

FIG. 2

```
┌─────────────────────────────┐
│ Initializing a number of orbit│
│ planes of a single layer satellite│
│ constellation and a number of│
│ satellites in each orbit    │
└─────────────────────────────┘
              │
              ▼
┌─────────────────────────────┐
│ Establishing two links at a │
│         same orbit          │
└─────────────────────────────┘
              │
              ▼
┌─────────────────────────────┐
│ Establishing two links at   │
│      adjacent orbits        │
└─────────────────────────────┘
```

FIG. 3

INTER-LAYER LINK DESIGN METHOD OF
MULTILAYER CONSTELLATIONS WITH
ENHANCED SERVICE COVERAGE
CAPABILITY

TECHNICAL FIELD

The disclosure relates to the field of multilayer satellite network technologies, and more particularly to an inter-layer link design method of multiplayer constellations with enhanced service coverage capacity.

BACKGROUND

A rapid development of a large-scale multilayer satellite network aims to provide a high-quality service for globally non-uniform traffic demands, and the high-quality service includes high throughput, low latency and reliable transmission. However, with an explosive growth of a number of satellites, the total average path length of the network is significantly increased, especially, each layer is relatively independent and stable, satellites in different layers move relatively with high speed, which bothers the cooperation between layers, and deteriorates the key metrics of network performances, such as the network throughput. Therefore, the establishment of inter-layer links is urgent, especially communication links between multilayer low earth orbit (LEO) satellite constellations, however, the establishment of the inter-layer links directly affects a network topology configuration, and then affects the network transmission efficiency, and finally affects the network throughput. Considering the network design issues with respect to the costs of building inter-layer links, the network stability maintaining and service coverage enhancement to the ground, how to establish the inter-layer links to maximize network performance is still a huge challenge.

The multilayer satellite network is a new development direction and trend of satellite communication networks. At present, all most established satellite communication networks adopt a single-layer arrangement method of the satellites, such as the iridium system and the global-star system. However, with increasing demands for ground applications, the terrestrial services present a non-uniform characteristic, and users are increased sharply, thus a single-layer satellite constellation cannot ensure a quality of the service. Compared to the single-layer satellite constellation, the multilayer satellite network can enhance the service coverage capacity, and ensure a service continuity of different services. Specifically, inter-layer links are a key component of the multilayer satellite network to give full play to its comprehensive service advantages. However, the inter-layer link will be covered by earth due to relative motions between the satellites and between satellites and earth, the inter-satellite link needs to be switched, which leads to a rapidly changed network topology, finally affecting the transmission efficiency. The management and scheduling for a multilayer satellite network with the time varying topology may be more complex, and a lot of manpower and material resources are consumed. Meanwhile, a difficulty of user mobility management is also increasing, and a transmission capacity performance of the entire network will be drastically reduced due to the switching of the inter-satellite link. Therefore, how to design the inter-layer link is important for improving the key performance of the entire network.

An existing design method for the inter-satellite link includes a design of an inter-layer link between a middle earth orbit (MEO) and LEO and a design of an inter-layer link between single-layer LEO satellite constellation an inter-layer link design between a large-scale multilayer LEO satellite constellations is still lacked, how to establish an inter-layer topology is an urgent problem to be solved when considering a limited number of antennas that LEO satellites can carry. Therefore, it is necessary to design the inter-layer links of the multilayer LEO satellites to reduce a transformation of the network topology, greatly improve the stability of the network, and enhance the service coverage capacity to the ground.

A development of the large-scale constellations has significantly increased a computational complexity of algorithms for establishing the network topology. Meanwhile, a mapping relationship between a network performance after transmission of the time-varying network topology configuration and the time-varying network topology configuration has not been thoroughly explored yet, which leads to high computational complexity of algorithms for designing the inter-satellite link. Therefore, for the large-scale multi-layer satellite constellations, how to design a fast estimation of network key performances and multi-layer topology transformation after adding the inter-layer links to reduce the computational complexity of algorithms for establishing the inter-layer links has become an important issue.

Weigang Bai, Haoqiang Lv et al. disclose an inter-layer link topology design method of MEO and LEO in their patent "inter-layer link topology design for LEO/MEO two-layer satellite constellations" (application NO. CN 202111507541. X, corresponding to patent publication NO. CN114301794A), and in the patent, an evaluation model of inter-layer information carrying capacity and inter-layer topology stability of multilayer constellations is designed to maximize a total inter-layer link rate based on time evolution of the inter-layer topology, to thereby explore topological performances under an antenna parameter configuration, and a topology structure of each time-slot is established based on a virtual topology scheme adopting a time slicing to design a 0-1 integer linear programming scheme based on the time evolution, under constraints of visible relationship, antenna transmission power, and a number of inter-layer antennas, a topology sequence of the inter-layer links is designed, so as to optimize a connection relationship between satellites on LEO and satellites on high orbital heights, improve the inter-layer topology stability and the inter-layer information carrying capacity, enhance inter-layer link stability, and reduce a handover frequency of inter-layer link antennas. The patent provides an inter-layer link assignment strategy with centralized decision-making, and the strategy extends a duration of the topology and reduces constellation handover costs. However, the provided assignment strategy of MEO-LEO links may be not applicable in large-scale LEO satellite networks since it lacks the analysis of the network performance differences caused by the changed network topology through the global network configuration perspective.

SUMMARY

In order to solve the above problems existed in the related art, the disclosure provides an inter-layer link design method of large-scale multilayer constellations with enhanced service coverage capacity. The technical problems of the disclosure are solved by the following technical solutions.

The disclosure provides an inter-layer link design method of multilayer constellations with enhanced service coverage capacity, and the method includes:

S1, establishing a multilayer satellite network spanning T time slots, and obtaining a position coordinate of each satellite in the multilayer satellite network at each time slot under a geocentric coordinate system;

S2, establishing an adjacency matrix of each layer in the multilayer satellite network;

S3, establishing a feasible set of inter-layer links between adjacent two layers of satellite constellation in the multilayer satellite network at each time slot;

S4, establishing a globally non-uniform service model according to a geographical population distribution, dividing a surface of earth into multiple logical areas, and obtaining loads of the multiple logical areas according to global user data;

S5, computing a comprehensive weight of an inter-layer link composed of satellites on the adjacent two layers of satellite constellation in the feasible set of inter-layer links at each time slot according to inter-layer link durations and inter-layer link loads;

S6, establishing an assignment model of inter-layer links according to the comprehensive weight of the inter-layer link; and S7, optimizing, by using the assignment model of inter-layer links, an inter-layer link set in the feasible set of inter-layer links to obtain a target inter-layer link set.

In an exemplary embodiment, the inter-layer link design method further includes: applying the target inter-layer link set to provide services for ground services.

In an embodiment of the disclosure, step S1 includes:

S1a, establishing the multilayer satellite network spinning T time slots; where a number of layers in the multilayer satellite network is L layers;

S1b, obtaining constellation parameters, and obtaining, based on the constellation parameters, a longitude, a latitude and an altitude of each satellite in each layer of satellite constellation at each time slot; and S1c, obtaining the position coordinate of each satellite at each time slot in the geocentric coordinate system by using the longitude, the latitude and the altitude of each satellite in each layer of satellite constellation at each time slot.

In an embodiment of the disclosure, step S3 includes:

S3a, letting $f(c,g)$ indicate whether a $c^{th}$ satellite in an $i^{th}$ layer of satellite constellation and a $g^{th}$ satellite in an $(i+1)^{th}$ layer of satellite constellation satisfy a visible condition, and calculating a maximum visible Euclidean distance $d_{max}$ of satellites in two layers of satellite constellation, where a formula of the maximum visible Euclidean distance $d_{max}$ is as follows:

$$d_{max} = \sqrt{H_i^2 - (Re + ro)^2} + \sqrt{H_{i+1}^2 - (Re + ro)^2};$$

where $H_i$ represents an orbital altitude of the $i^{th}$ layer of satellite constellation, $H_{i+1}$ represents an orbital altitude of the $(i+1)^{th}$ layer of satellite constellation, Re represents a radius of the earth, ro represents a height of atmospheric; $1 \leq c \leq N_i$, $1 \leq g \leq N_{i+1}$, $N_i$ represents a total number of satellites on all orbits of the $i^{th}$ layer of satellite constellation, and $N_{i+1}$ represents a total number of satellites on all orbits of the $(i+1)^{th}$ layer of satellite constellation; and $i=1, 2, \ldots, L-1$;

S3b, calculating a Euclidean distance $d_{c,g}$ between the $c^{th}$ satellite in the $i^{th}$ layer of satellite constellation and the $g^{th}$ satellite in the $(i+1)^{th}$ layer of satellite constellation, where a formula of the Euclidean distance de is as follows:

$$d_{c,g} = \sqrt{(x_c - x_g)^2 + (y_c - y_g)^2 + (z_c - z_g)^2};$$

when $d_{c,g} < d_{max}$ is satisfied, $f(c,g)=1$; otherwise, $f(c,g)=0$; where $(x_c, y_c, z_c)$ represents a position coordinate of the $c^{th}$ satellite in the $i^{th}$ layer of satellite constellation, and $(x_g, y_g, z_g)$ represents a position coordinate of the $g^{th}$ satellite in the $(i+1)^{th}$ layer of satellite constellation; and S3c, determining, by using steps S3a and S3b, whether all satellite node pairs satisfy the visual condition, and storing values of $f(c,g)$ corresponding to the satellite node pairs to obtain the feasible set of inter-layer links $F_{i,i+1}$.

In an embodiment of the disclosure, step S5 includes:

S51, letting $y_{i,i+1}(u, v)$ indicate whether a $u^{th}$ satellite in the $i^{th}$ layer of satellite constellation and a $v^{th}$ satellite in the $(i+1)^{th}$ layer of satellite constellation compose an inter-layer link, when the $u^{th}$ satellite in the $i^{th}$ layer of satellite constellation and the $v^{th}$ satellite in the $(i+1)^{th}$ layer of satellite constellation compose the inter-layer link, $y_{i,i+1}(u, v)=1$; otherwise, $y_{i,i+1}(u, v)=0$;

S52, letting $\Delta T_{y_{i,i+1}(u,v)}^{th}$ indicate a total duration of the inter-layer link composed of the $u^{th}$ satellite in the $i^{th}$ layer of satellite constellation and the $v^{th}$ satellite in the $(i+1)^{th}$ layer of satellite constellation at a $t^{th}$ time slot, and letting $\Delta r_{y_{i,i+1}(u,v)}^{t}$ indicate a time remaining of the inter-layer link composed of the $u^{th}$ satellite in the $i^{th}$ layer of satellite constellation and the $v^{th}$ satellite in the $(i+1)^{th}$ layer of satellite constellation at the $t^{th}$ time slot, and obtaining a time weight of the inter-layer link as follows:

$$TR_{y_{i,i+1}(u,v)}^{t} = \frac{\Delta T_{y_{i,i+1}(u,v)}^{t}}{\max(\Delta T)} \cdot \frac{\Delta r_{y_{i,i+1}(u,v)}^{t}}{\max(\Delta r)};$$

S53, letting a traffic density of a coverage area of the $u^{th}$ satellite of the $i^{th}$ layer of satellite constellation on an $x^{th}$ logical area at the $t^{th}$ time slot as $$\delta_{i,u}^{t} = \frac{\rho_x}{\Omega_x^i},$$

mapping the traffic density of the $u^{th}$ satellite to a load of the corresponding inter-layer link, recording the load of the inter-layer link as $\delta_{y_{i,i+1}(u,v)}^{t} = \delta_{i,u}^{t} \cdot y_{i,i+1}(u, v)$, and obtaining a load weight of the corresponding inter-layer link as $$\Gamma_{y_{i,i+1}(u,v)}^{t} = \frac{\delta_{y_{i,i+1}(u,v)}^{t}}{\max(\delta)};$$

where $\rho_x$ represents a traffic density of the $x^{th}$ logical area, $\Omega_x^i$ represents a number of satellites in the $i^{th}$ layer of satellite constellation located at the $x^{th}$ logical area, and $\max(\delta)$ represents a maximum in a set S composed of all $\delta_{i,u}^{t}$; and S54, obtaining the comprehensive weight of the inter-layer link according to the time weight of the inter-layer link and the load weight of the inter-layer link, where a formula of the comprehensive weight is expressed as follows:

$$w_{i,i+1}^t(u, v) = TR_{y_{i,i+1}(u,v)}^t + \Gamma_{y_{i,i+1}(u,v)}^t.$$

In an embodiment of the disclosure, the assignment model of inter-layer links is expressed as follows;

$$\min \sum_{u=1}^{N_i} \sum_{v=1}^{N_{i+1}} y_{i,i+1}(u, v) \cdot \psi_{i,i+1} \quad (1)$$

$$\text{s.t.} \sum_{u=1}^{N_i} \sum_{v=1}^{N_{i+1}} \max w_{i,i+1}^t(u, v)$$

$$0 \leq \sum_{u=1}^{N_i} y_{i,i+1}(u, v) \leq 1, \forall v \in F_{i,i+1} \quad (2)$$

$$0 \leq \sum_{v=1}^{N_{i+1}} y_{i,i+1}(u, v) \leq 1, \forall u \in F_{i,i+1}; \quad (3)$$

where $\psi_{i,i+1}$ represents an average path length of network between the $i^{th}$ layer of satellite constellation and the $(i+1)^{th}$ layer of satellite constellation, the constraint (1) represents maximizing the comprehensive weight of the inter-layer link at each time slot, a constraint (2) represents that satellites in the $i^{th}$ layer of satellite constellation establish inter-layer link at most once in a time slot, and a constraint (3) represents that satellites in the $(i+1)^{th}$ layer of satellite constellation establish inter-layer link at most once in a time slot.

In an embodiment of the disclosure, step S7 includes:

S7a, letting a number of the inter-layer links as k, randomly establishing m numbers of populations P of inter-layer links, where each population includes k non-repeating inter-layer links connected by k satellites randomly selected from the $i^{th}$ layer of satellite constellation and k satellites randomly selected from the $(i+1)^{th}$ layer of satellite constellation; letting it as a number of iterations, initializing it=0, and letting $\psi$ as an average path length of an initial network (i.e., the multilayer satellite network after first randomly establishing the inter-layer links);

S7b, copying all inter-layer links of a $j^{th}$ population in the populations P to generate n numbers of clonal populations, where the n numbers of clonal populations are recorded as Q, a number of total populations is m+n, and the total populations are recorded as PQ, $p_c$ is set as a crossover probability, $p_x$ is set as a mutation probability, and $p_c+p_x=1$;

S7c, letting $\lambda$ as a probability generated randomly under a current number of iterations, and $0<\lambda<1$, when $\lambda<p_c$ is satisfied, randomly selecting a population $p_a$ in the total populations PQ as a crossover population, and crossing all other populations with the population $P_a$ by using a single point crossover method; when $\lambda \geq p_c$ is satisfied, executing step S7d;

S7d, randomly reordering satellites belonging to the $i^{th}$ layer of satellite constellation at end points of the inter-layer links of the $j^{th}$ population in the total populations PQ to obtain reordered satellites and a sequence of the recorded satellites, sequentially connecting, according to the sequence of the reordered satellites, the reordered satellites to satellites of the $(i+1)^{th}$ layer of satellite constellation, and updating the $j^{th}$ population as an updated inter-layer link set;

S7e, performing a maximum link weight matching operation on the satellites in the $i^{th}$ layer of satellite constellation and the $(i+1)^{th}$ layer of satellite constellation of the $j^{th}$ population by using a Hungarian algorithm, and updating the $j^{th}$ population as an updated inter-layer link set;

S7f, recording an adjacency matrix of an inter-layer topology composed of the updated inter-layer link set in the $j^{th}$ population of the total populations PQ as $adj_{i,i+1}$, obtaining an adjacency matrix of an entire network as $$adj_j = \begin{pmatrix} adj_i & adj_{i,i+1} \\ adj_{i,i+1}^T & adj_{i+1} \end{pmatrix},$$

and obtaining, according to the adjacency matrix of the entire network a first moment $\langle d_j \rangle$ and a second moment $\langle d_j^2 \rangle$ of a degree distribution to obtain an average path length of the entire network;

S7g, selecting a population $P_o$ corresponding to a minimum average path length of the network $\psi_a$ from the clonal populations Q, adding the population $P_o$ into the populations P, and deleting a population $P_b$ corresponding to a maximum average path length of the network $\psi_b$ from the populations P; and S7h, when $\psi_a \leq \psi$ is satisfied, $\psi = \psi_a$, and it=it+1, executing step S7c; otherwise, ending the loop, outputting the population $P_o$ corresponding to the minimum average path length of the network $\psi_a$, that is, the target inter-layer link set $\Phi = P_o$.

In an embodiment of the disclosure, the randomly selecting a population $P_a$ in the total populations PQ as a crossover population, and crossing all other populations with the population $P_a$ by using a single point crossover method, includes:

randomly selecting a position in the population $P_a$ as a cross point, recording the cross point as g, recording populations other than the population $P_a$ as $P_c$, where $1 \leq g \leq 300$; and exchanging a first satellite to a $g^{th}$ satellite in a $s^{th}$ population in the populations $P_c$ and a first satellite to a $g^{th}$ satellite in the population $P_a$, where $1 \leq s \leq 149$.

In an embodiment of the disclosure, step S7e includes:
setting top markers of all satellites in the $i^{th}$ layer of satellite constellation in the $j^{th}$ population as a maximum comprehensive weight of the corresponding inter-layer links, and setting top markers of all satellites in the $(i+1)^{th}$ layer of satellite constellation in the $j^{th}$ population as 0; seeking a target marched set by using the Hungarian algorithm to make a sum of the comprehensive weights of all inter-layer links maximize, when the target marched set is not sought, sequentially modifying the top markers of the satellites in the $i^{th}$ layer of satellite constellation until the target marched set is sought; and obtaining the target marched set, and using the target marched set as the updated inter-layer link set of the $j^{th}$ population.

In an embodiment of the disclosure, step S7f includes:
S7f1, obtaining, according to the inter-layer topology and two intralayer topologies, the adjacency matrix of the entire network as $$adj_j = \begin{pmatrix} adj_i & adj_{i,i+1} \\ adj_{i,i+1}^T & adj_{i+1} \end{pmatrix},$$

making a degree of a $e^{th}$ satellite as $deg_e$, where a formula of the first moment of the degree distribution is expressed as follows:

$$\langle d_j \rangle = \frac{\sum_{e=1}^{N} deg_e}{N},$$

where $1 \le e \le N$;

S7f2, calculating the second moment of the degree distribution according to the first moment of the degree distribution, where a formula of the second moment of the degree distribution is expressed as follows:

$$\langle d_j^2 \rangle = \langle d_j \rangle^2 + \langle d_j \rangle;$$

S7f3, calculating the average path length of the entire network according to the first moment and the second moment of the degree distribution, where a formula of the average path length of the entire network is expressed as follows:

$$\psi_j = \frac{\ln(N/\langle d_j \rangle)}{\ln(\langle d_j^2 \rangle / \langle d_j \rangle)} + 1.$$

Compared to the related art, beneficial effects of the disclosure are as follows.

1. In the method of the disclosure, the feasible set of inter-layer links is established according to an established condition of inter-layer links; a mapping relationship between network topology transmission and network transmission performances after adding the inter-layer link is analyzed, the globally terrestrial traffic model is established according to the geographical population distribution, and the comprehensive weight of the inter-layer link is determined by a current maximum sustainable duration of the inter-satellite link, to thereby establish the assignment model of inter-layer links; and the inter-layer link set is optimized in the feasible set of inter-layer links by combining a genetic algorithm and the maximum weight matching algorithm, to obtain the optimized inter-layer link set (i.e., target inter-layer link set). The disclosure establishes the inter-layer links and designs the large-scale satellite network inter-layer topologies, a throughput of the large-scale multilayer satellite network is significantly improved through optimizing the inter-layer topology structure, and the service coverage capacity for the globally non-uniform services is effectively improved.

2. In the disclosure, the inter-layer topology is designed through establishing the inter-layer links, an optimal inter-layer topology is sought according to changed topology characteristics of the entire network (i.e., the degree distribution), and the first moment and the second moment of the degree distribution are calculated to obtain an average hop count of the network, so as to avoid exhaustive hop count statistics for all satellite node pairs in the entire network; the comprehensive weight of the inter-layer link is established according to a sustainable time of the inter-layer link and the load of the inter-layer link for the globally non-uniform services, to thereby improve the service coverage capacity of the satellite network for the ground services and decrease handover times of the inter-layer links; the feasible set of inter-layer links is established to reduce an establishment scale of the inter-layer links, the population of the inter-layer links is established by combining the genetic algorithm and the maximum weight matching algorithm, to provide the inter-layer link set with a minimum average path length of the entire network for a specified number of the inter-layer link sets, and to reduce an establishment complexity of the inter-layer link from an exponential computation complexity to a polynomial computational complexity.

The disclosure will be described in detail in conjunction with drawings and embodiments below.

BRIEF DESCRIPTION OF DRAWINGS

FIG. 2 illustrates a schematic diagram of a network scenario for establishing satellite inter-layer links provided in an embodiment of the disclosure.

FIG. 3 illustrates an implementation flowchart of an adjacency matrix of a single layer of satellite constellation provided in an embodiment of the disclosure.

DETAILED DESCRIPTION OF EMBODIMENTS

Figure 1:
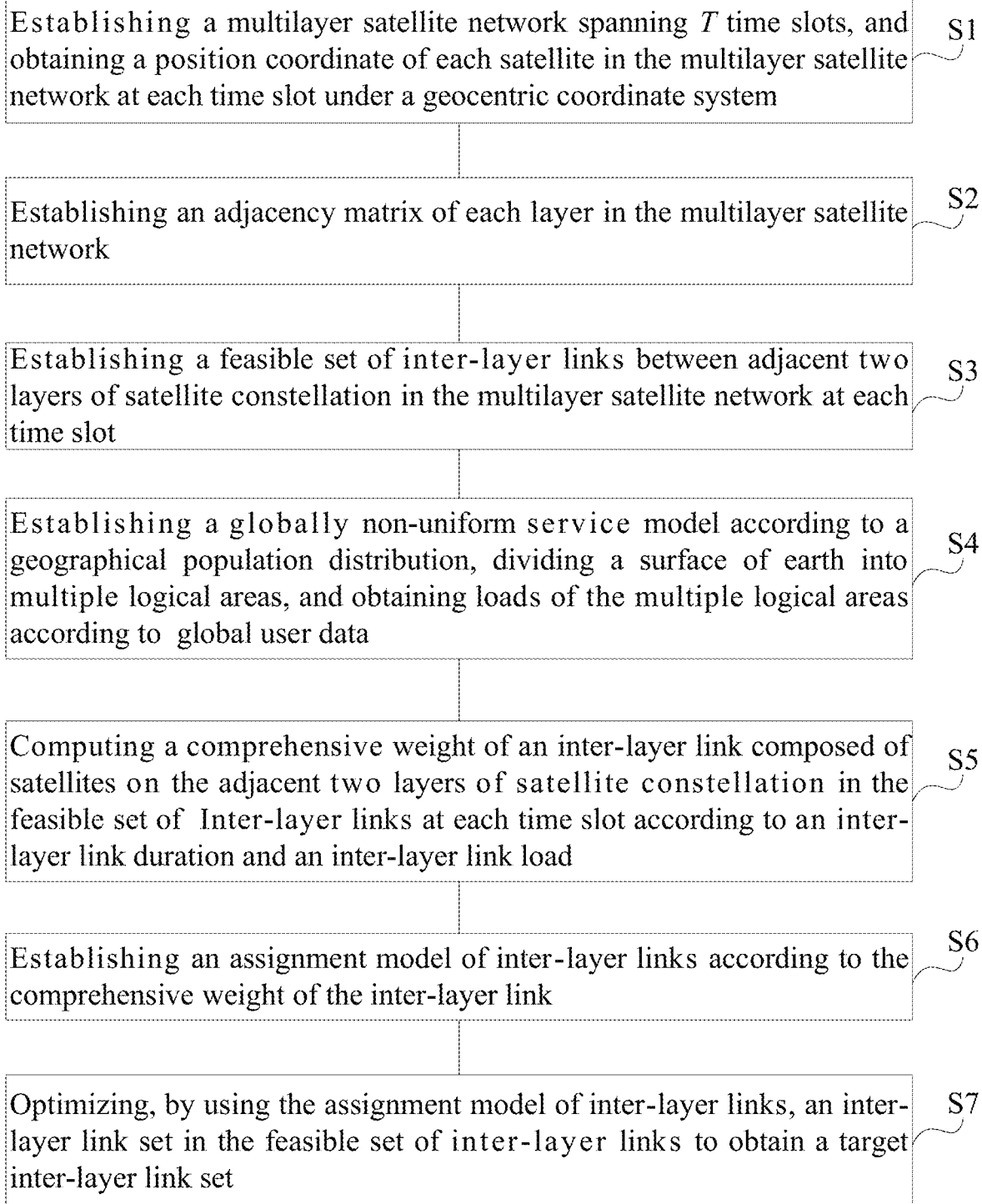
FIG. 1 illustrates a flowchart of an inter-layer link design method of large-scale multilayer constellations with enhanced service coverage capacity provided in an embodiment of the disclosure.

In order to further describe technical means adopted in the disclosure for achieving an intended invention purpose and effects of the technical means, an inter-layer link design method of large-scale multilayer constellations with enhanced service coverage capacity provided in the disclosure is described in detail below in conjunction with drawings and embodiments.

Aforementioned and other technical content, features, and functions of the disclosure can be clearly presented in detailed description of the embodiments in conjunction with the drawings below. Through the description of the embodiments, a deeper and more specific understanding of the technical means and effects adopted by the disclosure to achieve the intended purpose can be obtained, however, the drawings are merely for reference and description, and are not intended to limit technical solutions of the disclosure.

It should be noted that in this paper, relationship terms such as first and second are merely used to distinguish one entity or operation from another entity or operation, without necessarily requiring or implying any actual relationship or order between these entities or operations. Moreover, terms "include", "comprise" or any other variants are intended to cover non-exclusive inclusion, thus, items or equipment that include a series of elements not only include those elements, but also other elements that are not explicitly listed. Without further limitations, the elements limited by a statement "including a . . . " do not exclude the existence of other identical elements in the item or equipment containing the elements.

In an embodiment, a large-scale multilayer satellite network is established through satellite network parameters. The network includes two layers of satellite constellation, five-tuple parameters of a Kuiper single layer constellation are designed, and the five-tuple parameters include a number of orbital planes, a number of satellites in each orbit, a phase factor, an altitude and an orbital inclination. In an embodiment, a permanent inter-layer link is established through each satellite in a single layer of satellite constellation and adjacent two satellites in a same orbit of satellite constellation, and left and right inter-layer links are established through each satellite in the single layer of satellite constellation and two satellites in adjacent orbits of satellite constellation, to thereby design a mesh topology configuration, and generate a topology adjacency matrix of each layer of satellite constellation. A feasible set of inter-layer links is established according to a physical establishment principle of the inter-layer links, and the physical establishment principle includes a visibility, a same directionally and a transmitting power of the satellite, meanwhile, a ground service transmitted by each inter-layer link is established based on ground areas covered by the satellites, specifically, the ground service is obtained by dividing earth surface into 72 logical areas, and counting user data of global networks in each area. A comprehensive weight of each inter-layer link in the feasible set of inter-layer links is calculated according to a duration and a load of the inter-layer link, and an assignment model of inter-layer links is established. An inter-layer link set is optimized in the feasible set of inter-layer links by combining a genetic algorithm and a maximum weight matching algorithm to obtain an optimized inter-layer link set (i.e., target inter-layer link set).

Specifically, as shown in FIG. 1, FIG. 1 illustrates a flowchart of an inter-layer link design method of large-scale multilayer constellations with enhanced service coverage capacity provided in the embodiment of the disclosure, and the method includes the following steps S1-S7.

In step S1, a large-scale multilayer satellite network spinning T time slots is established, and a position coordinate of each satellite in the multilayer satellite network at each time slot under a geocentric coordinate system is obtained.

In the embodiment, the step S1 includes the following steps S1a-S1d.

In step S1a, the large-scale multilayer satellite network is established.

As shown in FIG. 2, FIG. 2 illustrates a schematic diagram of a network scenario for establishing satellite inter-layer links provided in the embodiment of the disclosure, two layers of the Kuiper constellation are taken as an example, in the two layers, a number of corresponding orbital planes and a number of corresponding satellites in each orbit are respectively as $P_1=28$, $S_1=28$, $P_2=36$, and $S_2=36$, specifically, $P_1$ represents a number of orbits of a first layer of the Kuiper constellation, $P_2$ represents a number of orbits of a second layer of the Kuiper constellation, $S_1$ represents a number of satellites in each orbit of the first layer of the Kuiper constellation, and $S_2$ represents a number of satellites in each orbit of the second layer of the Kuiper constellation. Two-layer trajectories of the Kuiper constellation can be exported by using a satellite tool kit (STK) software for a total duration of 2 hours, with each time slot being 1 second, and a longitude, a latitude, and an altitude of a satellite at each time slot can be obtained, specifically, $N=N_1+N_2=28\times28+36\times36$, $N_1$ represents a total number of satellites in all orbits of the first layer of the Kuiper constellation, $N_2$ represents a total number of satellites in all orbits of the second layer of the Kuiper constellation, and N represents a total number of satellites in the first layer and the second layer of the Kuiper constellation.

In step S1b, constellation parameters are input into the STK (i.e., satellite tool kit) software, the constellation parameters are used to calculate data information of a longitude, a latitude, and an altitude of each satellite in each layer of the satellite constellation, the data information of the longitude, the latitude, and the altitude are respectively recorded as Lon, Lat, and Alt, and the constellation parameters include the number of orbit planes, the number of satellites in each orbit, the phase factor, the altitude and the orbital inclination.

In step S1c, the position coordinate of each satellite at each time slot in the geocentric coordinate system is obtained by using the longitude, the latitude, and the altitude of each satellite in each layer of satellite constellation at each time slot.

Specifically, for a longitude, a latitude and an altitude of an $u^{th}$ satellite, a geographic coordinate system is converted to the geocentric coordinate system, and a position coordinate of the $u^{th}$ satellite under the geocentric coordinate system is expressed as follows:

$$x_u = Alt_u * \cos(Lat_u) * \sin(Lon_u),$$
$$y_u = Alt_u * \sin(Lat_u),$$
$$z_u = Alt_u * \cos(Lat_u) * \cos(Lon_u);$$

where $1 \leq u \leq N_1+N_2$, $x_u$, $y_u$, and $z_u$ represent the position coordinate of the $u^{th}$ satellite under the geocentric coordinate system, $Lon_u$ represents the longitude of the $u^{th}$ satellite, $Lat_u$ represents the latitude of the $u^{th}$ satellite, and $Alt_u$ represents the altitude of the $u^{th}$ satellite.

In step S1d, the position coordinates of all satellites under the geocentric coordinate system are obtained by using expressions of step S1c, and the position coordinates are recorded as G.

In step 2, an adjacency matrix of each layer in the multilayer satellite network are established.

In the embodiment, an adjacent matrix $adj_i$ of an $i^{th}$ layer of the Kuiper constellation is established, where $1 \leq i \leq L=2$, L represents a total number of layers of the Kuiper constellation. As shown in FIG. 3, FIG. 3 illustrates an implementation flowchart of an adjacency matrix of a single layer of the Kuiper constellation provided in the embodiment of the disclosure. In the embodiment, a method for establishing the adjacency matrix of the single layer of the Kuiper constellation includes three steps, and the three steps include: establishing two links in a same orbit, establishing two links in adjacent orbits, and establishing the adjacency matrix.

Specifically, the step S2 of the embodiment includes the following steps S2a-S2c.

In step S2a, the adjacent matrix $adj_i$ is used as a two-dimensional matrix to establish the two links in the same layer, and formulas of a $s^{th}$ satellite in a $p^{th}$ orbit of the $i^{th}$ layer of satellite constellation are expressed as follows:

$$adj_i((p-1)\cdot S_i + s,\ (p-1)\cdot S_i + s + 1) = 1;$$
$$adj_i((p-1)\cdot S_i + s + 1,\ (p-1)\cdot S_i + s) = 1;$$

where $S_i$ represents a number of satellites in each orbit of the $i^{th}$ layer of satellite constellation, and $1 \leq s \leq S_i - 1$; and $P_i$ represents a number of orbits of the $i^{th}$ layer of satellite constellation, and $1 \leq p \leq P_i$.

In step S2b, a $S_i^{th}$ satellite (i.e., last one satellite) in the $p^{th}$ orbit of the $i^{th}$ layer of satellite constellation is connected to a first satellite in the $p^{th}$ orbit of the $i^{th}$ layer of satellite constellation to obtain the following expressions:

$$adj_i((p-1)\cdot S_i + S_i,\ (p-1)\cdot S_i + 1) = 1;$$
$$adj_i((p-1)\cdot S_i + 1,\ (p-1)\cdot S_i + S_i) = 1.$$

In step S2c, the two links in adjacent orbits are established, and formulas for a $s^{th}$ satellite in a $pp^{th}$ orbit of the $i^{th}$ layer of satellite constellation are expressed as follows:

$$adj_i((pp-1)\cdot S_i + ss,\ pp\cdot S_i + ss) = 1;$$
$$adj_i(pp\cdot S_i + ss,\ (pp-1)\cdot S_i + ss) = 1;$$

where $1 \leq pp \leq P_i - 1$, and $1 \leq ss \leq S_i$.

In step S3, a feasible set of inter-layer links between adjacent two layers of satellite constellation in the multilayer satellite network at each time slot is established.

Specifically, the feasible set of inter-layer links $F_{i,i+1}$ between the $i^{th}$ layer of satellite constellation and an $(i+1)^{th}$ layer of satellite constellation is established, and the step S3 includes the following steps S3a-S3c.

In step S3a, $f(c,g)$ is used to indicate whether a $c^{th}$ satellite in the $i^{th}$ layer and a $g^{th}$ satellite in the $(i+1)^{th}$ layer satisfy a visible condition, a maximum visible Euclidean distance $d_{max}$ of satellites in two layers of satellite constellation is calculated, and a formula of the maximum visible Euclidean distance $d_{max}$ is expressed as follows:

$$d_{max} = \sqrt{H_1^2 - (Re + ro)^2} + \sqrt{H_2^2 - (Re + ro)^2};$$

where $H_1$ represents an orbital altitude of the $i^{th}$ layer of satellite constellation, and $H_1=590$ km, $H_2$ represents an orbital altitude of the $(i+1)^{th}$ layer of satellite constellation, and $H_2=610$ km; Re represents a radius of earth, and Re=6371 km; ro represents a height of atmospheric, and ro=50 km; and $1 \leq c \leq N_1$, $1 \leq g \leq N_2$, $N_i$ represents a total number of satellites on all orbits of the $i^{th}$ layer of satellite constellation, and $N_2$ represents a total number of satellites on all orbits of the $(i+1)^{th}$ layer of satellite constellation;

In the embodiment, a total number of layers of the Kuiper constellation L is 2, therefore, correspondingly, $H_1$ represents an orbital altitude of a first layer of satellite constellation, $H_2$ represents an orbital altitude of a second layer of satellite constellation, $N_i$ represents a total number of satellites on all orbits of the first layer of satellite constellation, and $N_2$ represents a total number of satellites on all orbits of the second layer of satellite constellation.

In step S3b, a Euclidean distance $d_{c,g}$ between the $c^{th}$ satellite in the $i^{th}$ layer of satellite constellation and the $g^{th}$ satellite in the $(i+1)^{th}$ layer of satellite constellation is calculated, a formula of the Euclidean distance $d_{c,g}$ is $d_{c,g} = \sqrt{(x_c - x_g)^2 + (y_c - y_g)^2 + (z_c - z_g)^2}$; when $d_{c,g} < d_{max}$, $f(c,g)=1$; otherwise, $f(c,g)=0$; where $(x_c, y_c, z_c)$ represents a position coordinate of the $c^{th}$ satellite in the $i^{th}$ layer of satellite constellation, and $(x_g, y_g, z_g)$ represents a position coordinate of the $g^{th}$ satellite in the $(i+1)^{th}$ layer of satellite constellation.

In step S3c, whether all satellite node pairs (e.g., each satellite node pair includes a satellite in the $i^{th}$ layer of satellite constellation and a satellite in the $(i+1)^{th}$ layer of satellite constellation) satisfy the visual condition is determined by using step S3a and step S3b, and values of $f(c,g)$ corresponding to the satellite node pairs are stored to obtain the feasible set of inter-layer links $F_{i,i+1}$.

In step S4, a globally non-uniform service model is established according to a geographical population distribution, a surface of the earth is divided into 72 logical areas, loads of the logical areas are obtained according to global user data, and a traffic density of a $x^{th}$ logical area is denoted as $\rho_x$.

In step S5, a comprehensive weight of an inter-layer link composed of satellites on the adjacent two layers of satellite constellation in the feasible set of inter-layer links at each time slot is computed according to inter-layer link durations and inter-layer link loads.

Specifically, the step S5 of the embodiment includes the following steps S51-S54.

In step S51, $y_{i,i+1}(u, v)$ is used to indicate whether a $u^{th}$ satellite in the $i^{th}$ layer of satellite constellation and a $v^{th}$ satellite in the $(i+1)^{th}$ layer of satellite constellation compose an inter-layer link, when the $u^{th}$ satellite in the $i^{th}$ layer of satellite constellation and the $v^{th}$ satellite in the $(i+1)^{th}$ layer of satellite constellation compose an inter-layer link, $y_{i,i+1}(u, v)=1$; otherwise, $y_{i,i+1}(u, v)=0$.

In step S52, $\Delta T_{y_{i,i+1}(u,v)}^t$ is used to indicate a total duration of the inter-layer link composed of the $u^{th}$ satellite in the $i^{th}$ layer of satellite constellation and the $v^{th}$ satellite in the $(i+1)^{th}$ layer of satellite constellation at a $i^{th}$ time slot, $\Delta r_{y_{i,i+1}(u,v)}^t$ is used to indicate a time remaining of the inter-layer link composed of the $u^{th}$ satellite in the $i^{th}$ layer of satellite constellation and the $v^{th}$ satellite in the $(i+1)^{th}$ layer of satellite constellation at the $t^{th}$ time slot, and a time weight of the inter-layer link is obtained and expressed as follows:

$$TR_{y_{i,i+1}(u,v)}^t = \frac{\Delta T_{y_{i,i+1}(u,v)}^t}{\max(\Delta T)} \cdot \frac{\Delta r_{y_{i,i+1}(u,v)}^t}{\max(\Delta r)}.$$

In step S53, a traffic density of a coverage area of the $u^{th}$ satellite in the $i^{th}$ layer of satellite constellation at the $i^{th}$ time slot on the $x^{th}$ logical area is denoted as $$\delta_{i,u}^t = \frac{\rho_x}{\Omega_x^i},$$

the traffic density of the $u^{th}$ satellite is mapped to a load of the corresponding inter-layer link, the load of the corresponding inter-layer link is recorded as $\delta_{y_{i,i+1}(u,v)}^t = \delta_{i,u}^t \cdot y_{i,i+1}(u, v)$, and a load weight of the corresponding inter-layer link is obtained as $$\Gamma_{y_{i,i+1}(u,v)}^t = \frac{\delta_{y_{i,i+1}(u,v)}^t}{\max(\delta)};$$

and $\rho_x$ represents a traffic density of the $x^{th}$ logical area, $\Omega_x^i$ represents a number of satellites in the $i^{th}$ layer of satellite constellation located at the $x^{th}$ logical area, and $\max(\delta)$ represents a maximum in a set $\delta$ composed of all $\delta_{i,u}^t$.

In step S54, the comprehensive weight of the inter-layer link is obtained according to the time weight and the load weight of the inter-layer link, and a formula of the comprehensive weight is expressed as follows:

$$w^t_{i,i+1}(u, v) = TR^t_{y_{i,i+1}(u,v)} + \Gamma^t_{y_{i,i+1}(u,v)}.$$

In step S6, an assignment model of inter-layer links is obtained according to the comprehensive weight of the inter-layer link, Specifically, the assignment model of inter-layer links is expressed as follows:

$$\min \sum_{u=1}^{N_i} \sum_{v=1}^{N_{i+1}} y_{i,i+1}(u, v) \cdot \psi_{i,i+1} \quad (1)$$

$$\text{s.t.} \sum_{u=1}^{N_i} \sum_{v=1}^{N_{i+1}} \max w^t_{i,i+1}(u, v)$$

$$0 \le \sum_{u=1}^{N_i} y_{i,i+1}(u, v) \le 1, \forall v \in F_{1,i+1} \quad (2)$$

$$0 \le \sum_{v=1}^{N_{i+1}} y_{i,i+1}(u, v) \le 1, \forall u \in F_{i,i+1}; \quad (3)$$

where $\psi_{i,i+1}$ represents an average path length of network between the $i^{th}$ layer of satellite constellation and the $(i+1)^{th}$ layer of satellite constellation, the constraint (1) represents maximizing the comprehensive weight of the inter-layer link at each time slot, the constraint (2) represents that satellites in the $i^{th}$ layer of satellite constellation establish inter-layer link at most once in a time slot, and the constraint (3) represents that satellites in the $(i+1)^{th}$ layer of satellite constellation establish inter-layer link at most once in a time slot.

In step S7, an inter-layer link set is optimized in the feasible set of inter-layer links based on the assignment model of inter-layer links and combining the genetic algorithm and the maximum weight matching algorithm, to obtain the optimized inter-layer link set.

Figure 4:
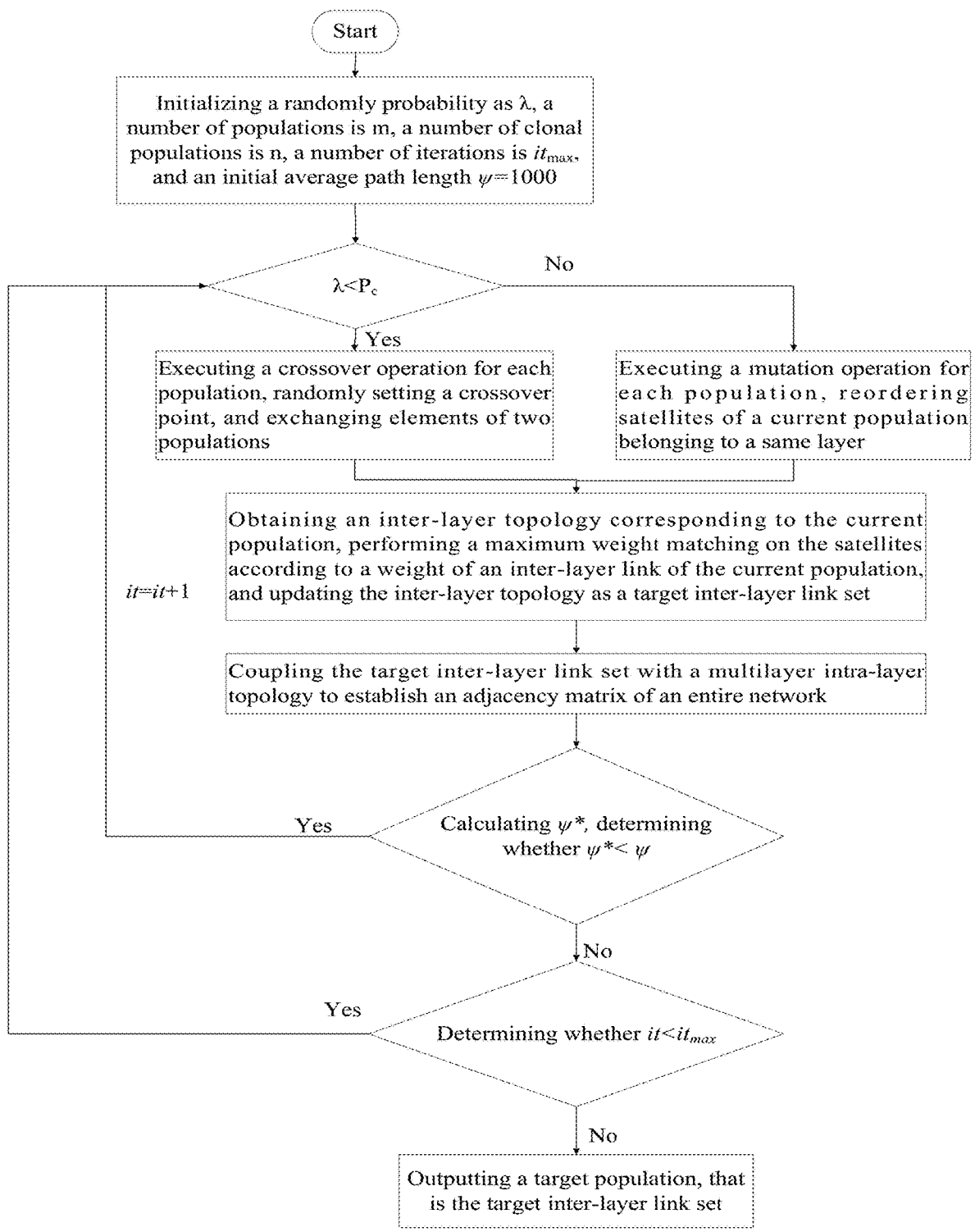
FIG. 4 illustrates an implementation flowchart of an establishment of inter-layer links of multilayer satellite constellation provided in an embodiment of the disclosure.

FIG. 4 illustrates an implementation flowchart for establishing inter-layer links of multilayer constellations provided in the embodiment of the disclosure, and step S7 of the embodiment includes the following steps S7a-S7h.

In step S7a, a number of inter-layer links k is as k=300, m numbers of populations P of inter-layer link are established randomly, and each population includes 300 non-repeating inter-layer links connected by k satellites randomly selected from the first layer of satellite constellation and k satellites randomly selected from the second layer of satellite constellation, a number of iterations is denoted as it, it is initialized as it=0, an average path length of an initial network is denoted as ψ, ψ=1000, and m=100.

In step S7b, all inter-layer links of a $j^{th}$ population in the populations P are copied to generate n numbers of clonal populations Q, a number of total populations is 150, and the total populations are recorded as PQ, $p_c$ is set as a crossover probability, $p_x$ is set as a mutation probability, and $p_c+p_x=1$, specifically, n=50, $p_c$=0.6, and $p_x$=0.4.

In step S7c, a probability generated randomly under a current number of iterations is denoted as λ, and 0<λ<1, when λ<$p_c$ is satisfied, a population $P_a$ in the total populations PQ is randomly selected as a crossover population, and other populations are crossed with the population $P_a$ by using a single point crossover method; when λ≥$p_c$ is satisfied, step S7d is executed.

Specifically, a position in the population $P_a$ is randomly selected as a crossover point, and the crossover point is recorded as g, let $P_a'=P_a$, and populations other than the population $P_a$ is recorded as $P_c$, specifically, 1≤g≤300; and a first satellite to a $g^{th}$ satellite of a $s^{th}$ population in the populations $P_c$ are exchanged with a first satellite to a $g^{th}$ satellite in the population $P_a$, and 1≤s≤149.

In step S7d, satellites belonging to the $i^{th}$ layer of satellite constellation at end points of the inter-layer links of the $j^{th}$ population in the total populations PQ are randomly reordered to obtain reordered satellites and a new sequence of the reordered satellites, the reordered satellites are sequentially connected to satellites in the $(i+1)^{th}$ layer of satellite constellation according to the new sequence of the reordered satellites, and the $j^{th}$ population is updated as an updated inter-layer link set.

In step S7e, a maximum link weight matching operation is performed on the satellites in the $i^{th}$ layer of satellite constellation and the $(i+1)^{th}$ layer of satellite constellation in the $j^{th}$ population by using a Hungarian algorithm, and the $j^{th}$ population is updated as an updated inter-layer link set.

Specifically, top markers of all satellites in the $i^{th}$ layer of satellite constellation in the $j^{th}$ population are set as a maximum comprehensive weight of the corresponding inter-layer links, and top markers of all satellites in the $(i+1)^{th}$ layer of satellite constellation in the $j^{th}$ population are set as 0; a target matched set is sought by using the Hungarian algorithm to maximize a sum of the comprehensive weights of all inter-layer links, when the target matched set is not sought, the top markers of the satellites in the $i^{th}$ layer of satellite constellation are sequentially modified until the target matched set is sought; and the target matched set is obtained, and the target matched set is used as the updated inter-layer link set of the $j^1$ population.

In step S7f, an adjacency matrix of an inter-layer topology composed of the updated inter-layer link set in the $j^{th}$ population of the total populations PQ is recorded as $adj_{i,i+1}$, an adjacency matrix of an entire network is obtained as $$adj_j = \begin{pmatrix} adj_i & adj_{i,i+1} \\ adj^T_{i,i+1} & adj_{i+1} \end{pmatrix},$$

a first moment $\langle d_j \rangle$ and a second moment $\langle d_j^2 \rangle$ of a degree distribution are obtained according to the adjacency matrix of the entire network to obtain an average path length of the entire network.

Specifically, step S7f of the embodiment includes the following steps S7f1-S7f3.

In step S7f1, the adjacency matrix of the entire network is obtained according to the interlayer topology and two intralayer topologies, and the adjacency matrix of the entire network is $$adj_j = \begin{pmatrix} adj_i & adj_{i,i+1} \\ adj^T_{i,i+1} & adj_{i+1} \end{pmatrix},$$

a degree of an $e^{th}$ satellite is let as $deg_e$, and the first moment of the degree distribution is expressed as follows:

$$\langle d_j \rangle = \frac{\sum_{e=1}^{N} deg_e}{N};$$

where 1≤e≤N.

In step S7f2, the second moment of the degree distribution is calculated according to the first moment of the degree distribution, and a formula for calculating the second moment of the degree distribution is expressed as follows:

$$\langle d_j^2 \rangle = (d_j)^2 + \langle d_j \rangle.$$

In step S7f3, the average path length of the entire network is calculated according to the first moment and the second moment of the degree distribution, and a formula for calculating the average path length of the entire network is expressed as follows:

$$\psi_j = \frac{\ln(N/\langle d_j \rangle)}{\ln(\langle d_j^2 \rangle / \langle d_j \rangle)} + 1.$$

In step S7g, a population $P_0$ corresponding to a minimum average path length of the network $\psi_a$ is selected from the clonal populations Q, the population $P_o$ is added into the populations P, and a population $P_b$ corresponding to a maximum average path length of the network $\psi_b$ is deleted from the populations P.

In step S7h, when $\psi_a \leq \psi_p$ is satisfied, $\psi = \psi_a$, and let it=it+1, then step 7c is executed; otherwise, the loop is ended, and the population $P_b$ corresponding to the maximum average path length of the network $\psi_b$ is output, that is, the target inter-layer link set is $\Phi = P_o$.

The embodiment of the disclosure provides an inter-layer link design method of large-scale multilayer constellations with enhanced service coverage capacity, the global ground service model is established through the geographical population distribution, and the comprehensive weight of the inter-layer link is determined by a weighting of a normalized weight of a maximum currently sustainable duration of the inter-layer link, a service coverage capacity of the network and a stability of the links are maximized by using a maximum weight weighting algorithm, to reduce a switch of the inter-layer links and improve transmission capacity of the network. A mapping relationship between a network topology configuration with time-varying after transformation and network performances of the network topology configuration with time-varying after transformation is established to obtain statistical characteristics after adding the inter-layer links, that is, the first moment and the second moment of the degree distribution are used to estimate the average path length of the entire network, thus avoiding exhaustive hop count statistics for all satellite node pairs in the entire network. An inter-layer link set with a minimum average path length of the entire network can be provided for a number of any inter-layer link set by combining the genetic algorithm and establishing populations of local inter-layer links, and a complexity for establishing the inter-layer links is reduced, the computational complexity is reduced from an exponential level to a polynomial level, which can be applied to the large-scale multilayer satellite network.

In the inter-layer link design method of the disclosure, according to an established condition of the inter-layer links, the mapping relationship between network topology transmission and network transmission performances after adding the inter-layer link is analyzed, the global ground service model is established according to the geographical population distribution, and the comprehensive weight of the inter-layer link is determined by a current maximum sustainable duration of the inter-layer link, to thereby establish the assignment model of inter-layer links; and the inter-layer link set is optimized in the feasible set of inter-layer links by combining a genetic algorithm and the maximum weight matching algorithm, to obtain the optimized inter-layer link set (i.e., target inter-layer link set). The disclosure establishes the inter-layer links and designs the large-scale satellite network inter-layer topologies, a throughput of the large-scale multilayer satellite network is significantly improved through optimizing the inter-layer topology structure, and the service coverage capacity for the globally non-uniform services is effectively improved.

Another embodiment of the disclosure provides a non-transient storage medium, the storage medium stores a computer program, and the computer program is configured to be executed to implement steps of the inter-layer link design method of multilayer constellations with enhanced service coverage capacity in the above embodiment. On the other hand, the disclosure provides an electronic device, the electronic device includes a memory and a processor, the memory stores the computer program, and the processor is configured to call the computer program stored in the memory to implement the steps of the inter-layer link design method of multilayer constellations with enhanced service coverage capacity in the above embodiment. Specifically, the above integrated module implemented in a form of software functional modules can be stored in a computer readable storage medium. The above software functional modules are stored in a storage medium, and the storage medium includes multiple instructions configured to make an electronic device (which can be a personal computer, a server, or a network device) or a processor to execute partial steps of the method in each embodiment of the disclosure. The above storage medium includes various medium that can store the computer program code such as a U-disk, a mobile hard drive, a read-only memory (ROM), a random-access memory (RAM), a disk and a light disk.

The above content is a detail description for the disclosure in conjunction with the embodiments, and specific implementations of the disclosure cannot be identified as limited to the description. Multiple simple deductions or substitutions without departing from a concept of the disclosure can be made by those skilled in the art, which should be considered as falling within a scope of protection of the disclosure.

What is claimed is:
1. An inter-layer link design method of multilayer constellations, comprising:
　S1, establishing a multilayer satellite network spanning T time slots, and obtaining a position coordinate of each satellite in the multilayer satellite network at each time slot under a geocentric coordinate system;
　S2, establishing an adjacency matrix of each layer in the multilayer satellite network;
　S3, establishing a feasible set of inter-layer links between adjacent two layers of satellite constellation in the multilayer satellite network at each time slot;
　S4, establishing a globally non-uniform service model according to a geographical population distribution, dividing a surface of earth into a plurality of logical areas, and obtaining loads of the plurality of logical areas according to global user data;
　S5, computing a comprehensive weight of an inter-layer link composed of satellites on the adjacent two layers of satellite constellation in the feasible set of inter-layer links at each time slot according to inter-layer link durations and inter-layer link loads;

S6, establishing an assignment model of inter-layer links according to the comprehensive weight of the inter-layer link; and S7, optimizing, by using the assignment model of inter-layer links, an inter-layer link set in the feasible set of inter-layer links to obtain a target inter-layer link set.

2. The inter-layer link design method of multilayer constellations as claimed in claim 1, wherein step S1 comprises:

S1a, establishing the multilayer satellite network spinning T time slots; wherein a number of layers in the multilayer satellite network is L layers;

S1b, obtaining constellation parameters, and obtaining, based on the constellation parameters, a longitude, a latitude and an altitude of each satellite in each layer of satellite constellation at each time slot; and S1c, obtaining the position coordinate of each satellite at each time slot in the geocentric coordinate system by using the longitude, the latitude and the altitude of each satellite in each layer of satellite constellation at each time slot.

3. The inter-layer link design method of multilayer constellations as claimed in claim 2, wherein step S2 comprises: establishing an adjacency matrix $adj_i$ of an $i^{th}$ layer of satellite constellation, specifically comprising:

S2a, letting the adjacent matrix $adj_i$ as a two-dimensional matrix to establish two links in a same orbit, wherein formulas of a $s^{th}$ satellite in a $p^{th}$ orbit of the $i^{th}$ layer of satellite constellation are expressed as follows:

$$adj_i((p-1) \cdot S_i + s, (p-1) \cdot S_i + s + 1) = 1;$$

$$adj_i((p-1) \cdot S_i + s + 1, (p-1) \cdot S_i + s) = 1;$$

wherein $S_i$ represents a number of satellites in each orbit of the $i^{th}$ layer of satellite constellation, and $1 \leq s \leq S_i - 1$; and $P_i$ represents a number of orbits of the $i^{th}$ layer of satellite constellation, and $1 \leq p \leq P_i$;

S2b, connecting a $S_i^{th}$ satellite in the $p^{th}$ orbit of the $i^{th}$ layer of satellite constellation to a first satellite in the $p^{th}$ orbit of the $i^{th}$ layer of satellite constellation to obtain the following expressions:

$$adj_i((p-1) \cdot S_i + S_i, (p-1) \cdot S_i + 1) = 1;$$

$$adj_i((p-1) \cdot S_i + 1, (p-1) \cdot S_i + S_i) = 1;$$

S2c, establishing two links in adjacent orbits, wherein formulas for a $ss^{th}$ satellite in a $pp^{th}$ orbit of the $i^{th}$ layer of satellite constellation are expressed as follows:

$$adj_i((pp-1) \cdot S_i + ss, pp \cdot S_i + ss) = 1;$$

$$adj_i(pp \cdot S_i + ss, (pp-1) \cdot S_i + ss) = 1;$$

wherein $1 \leq pp \leq P_i - 1$, and $1 \leq ss \leq S_i$.

4. The inter-layer link design method of multilayer constellations as claimed in claim 2, wherein step S3 comprises:

S3a, letting $f(c,g)$ indicate whether a $c^{th}$ satellite in an $i^{th}$ layer of satellite constellation and a $g^{th}$ satellite in an $(i+1)^{th}$ layer of satellite constellation satisfy a visible condition, and calculating a maximum visible Euclidean distance $d_{max}$ of satellites in two layers of satellite constellation, wherein a formula of the maximum visible Euclidean distance $d_{max}$ is as follows:

$$d_{max} = \sqrt{H_i^2 - (Re+ro)^2} + \sqrt{H_{i+1}^2 - (Re+ro)^2};$$

wherein $H_i$ represents an orbital altitude of the $i^{th}$ layer of satellite constellation, $H_{i+1}$ represents an orbital altitude of the $(i+1)^{th}$ layer of satellite constellation, Re represents a radius of the earth, ro represents a height of atmospheric; $1 \leq c \leq N_i$, $1 \leq g \leq N_{i+1}$, $N_i$ represents a total number of satellites on all orbits of the $i^{th}$ layer of satellite constellation, and $N_{i+1}$ represents a total number of satellites on all orbits of the $(i+1)^{th}$ layer of satellite constellation; and $i=1, 2, \ldots, L-1$;

S3b, calculating a Euclidean distance $d_{c,g}$ between the $c^{th}$ satellite in the $i^{th}$ layer of satellite constellation and the $g^{th}$ satellite in the $(i+1)^{th}$ layer of satellite constellation, wherein a formula of the Euclidean distance $d_{c,g}$ is as follows:

$$d_{c,g} = \sqrt{(x_c - x_g)^2 + (y_c - y_g)^2 + (z_c - z_g)^2};$$

when $d_{c,g} < d_{max}$ is satisfied, $f(c,g)=1$; otherwise, $f(c,g)=0$; wherein $(x_c, y_c, z_c)$ represents a position coordinate of the $c^{th}$ satellite in the $i^{th}$ layer of satellite constellation, and $(x_g, y_g, z_g)$ represents a position coordinate of the $g^{th}$ satellite in the $(i+1)^{th}$ layer of satellite constellation; and S3c, determining, by using steps S3a and S3b, whether all satellite node pairs satisfy the visual condition, and storing values of $f(c,g)$ corresponding to the satellite node pairs to obtain the feasible set of inter-layer links $F_{i,i+1}$.

5. The inter-layer link design method of multilayer constellations as claimed in claim 4, wherein step S5 comprises:

S51, letting $y_{i,i+1}(u, v)$ indicate whether a $u^{th}$ satellite in the $i^{th}$ layer of satellite constellation and a $v^{th}$ satellite in the $(i+1)^{th}$ layer of satellite constellation compose an inter-layer link, when the $u^{th}$ satellite in the $i^{th}$ layer of satellite constellation and the $v^{th}$ satellite in the $(i+1)^{th}$ layer of satellite constellation compose the inter-layer link, $y_{i,i+1}(u, v)=1$; otherwise, $y_{i,i+1}(u, v)=0$;

S52, letting $\Delta T_{y_{i,i+1}(u,v)}^t$ indicate a total duration of the inter-layer link composed of the $u^{th}$ satellite in the $i^{th}$ layer of satellite constellation and the $v^{th}$ satellite in the $(i+1)^{th}$ layer of satellite constellation at a $t^{th}$ time slot, letting $\Delta r_{y_{i,i+1}(u,v)}^t$ indicate a time remaining of the inter-layer link composed of the $u^{th}$ satellite in the $i^{th}$ layer of satellite constellation and the $v^{th}$ satellite in the $(i+1)^{th}$ layer of satellite constellation at the $t^{th}$ time slot, and obtaining a time weight of the inter-layer link as follows:

$$TR_{y_{i,i+1}(u,v)}^t = \frac{\Delta T_{y_{i,i+1}(u,v)}^t}{\max(\Delta T)} \cdot \frac{\Delta r_{y_{i,i+1}(u,v)}^t}{\max(\Delta r)};$$

wherein $t=1, 2, \ldots, T$;

S53, letting a traffic density of a coverage area of the $u^{th}$ satellite in the $i^{th}$ layer of satellite constellation on an $x^{th}$ logical area at the $t^{th}$ time slot as $\delta_{i,u}^{t}=\rho_x/\Omega_x^{i}$, mapping the traffic density of the $u^{th}$ satellite to a load of the corresponding inter-layer link, recording the load of the inter-layer link as $\delta_{y_{i,i+1}(u,v)}^{t}=\delta_{i,u}^{t}\cdot y_{i,i+1}(u,v)$, and obtaining a load weight of the corresponding inter-layer link as $$\Gamma_{y_{i,i+1}(u,v)}^{t} = \frac{\delta_{y_{i,i+1}(u,v)}^{t}}{\max(\delta)};$$

wherein $\rho_x$ represents a traffic density of the $x^{th}$ logical area, $\Omega_x^{i}$ represents a number of satellites in the $i^{th}$ layer of satellite constellation located at the $x^{th}$ logical area, and $\max(\delta)$ represents a maximum in a set $\delta$ composed of all $\delta_{i,u}^{t}$; and S54, obtaining the comprehensive weight of the inter-layer link according to the time weight of the inter-layer link and the load weight of the inter-layer link, wherein a formula of the comprehensive weight is expressed as follows:

$$W_{i,i+1}^{t}(u,v) = TR_{y_{i,i+1}(u,v)}^{t} + \Gamma_{y_{i,i+1}(u,v)}^{t}.$$

6. The inter-layer link design method of multilayer constellations as claimed in claim 5, wherein the assignment model of inter-layer links is expressed as follows:

$$\min \sum_{u=1}^{N_i} \sum_{v=1}^{N_{i+1}} y_{i,i+1}(u,v) \cdot \psi_{i,i+1}$$

$$\text{s.t.} \sum_{u=1}^{N_i} \sum_{v=1}^{N_{i+1}} \max w_{i,i+1}^{t}(u,v) \quad (1)$$

$$0 \leq \sum_{u=1}^{N_i} y_{i,i+1}(u,v) \leq 1, \forall v \in F_{i,i+1} \quad (2)$$

$$0 \leq \sum_{v=1}^{N_{i+1}} y_{i,i+1}(u,v) \leq 1, \forall u \in F_{i,i+1}; \quad (3)$$

wherein $\psi_{i,i+1}$ represents an average path length of network between the $i^{th}$ layer of satellite constellation and the $(i+1)^{th}$ layer of satellite constellation, the constraint (1) represents maximizing the comprehensive weight of the inter-layer link at each time slot, the constraint (2) represents that satellites in the $i^{th}$ layer of satellite constellation establish inter-layer link at most once in a time slot, and the constraint (3) represents that satellites in the $(i+1)^{th}$ layer of satellite constellation establish inter-layer link at most once in a time slot.

7. The inter-layer link design method of multilayer constellations as claimed in claim 5, wherein step S7 comprises:

S7a, letting a number of the inter-layer links as k, randomly establishing m numbers of populations P of inter-layer links, wherein each population comprises k non-repeating inter-layer links connected by k satellites randomly selected from the $i^{th}$ layer of satellite constellation and k satellites randomly selected from the $(i+1)^{th}$ layer of satellite constellation; letting it as a number of iterations, initializing it=0, and letting $\psi$ as an average path length of an initial network;

S7b, copying all inter-layer links of a $j^{th}$ population in the populations P to generate n numbers of clonal populations, wherein the n numbers of clonal populations are recorded as Q, a number of total populations is m+n, and the total populations are recorded as PQ, $p_c$ is set as a crossover probability, $p_x$ is set as a mutation probability, and $p_c+p_x=1$;

S7c, letting $\lambda$ as a probability generated randomly under a current number of iterations, and $0<\lambda<1$, when $\lambda<p_c$ is satisfied, randomly selecting a population $P_a$ in the total populations PQ as a crossover population, and crossing all other populations with the population $P_a$ by using a single point crossover method; when $\lambda \geq p_c$ is satisfied, executing step S7d;

S7d, randomly reordering satellites belonging to the $i^{th}$ layer of satellite constellation at end points of the inter-layer links of the $j^{th}$ population in the total populations PQ to obtain reordered satellites and a sequence of the recorded satellites, sequentially connecting, according to the sequence of the reordered satellites, the reordered satellites to satellites of the $(i+1)^{th}$ layer of satellite constellation, and updating the $j^{th}$ population as an updated inter-layer link set;

S7e, performing a maximum link weight matching operation on the satellites in the it layer of satellite constellation and the $(i+1)^{th}$ layer of satellite constellation in the j population by using a Hungarian algorithm, and updating the $j^{th}$ population as an updated inter-layer link set;

S7f, recording an adjacency matrix of an inter-layer topology composed of the updated inter-layer link set in the $j^{th}$ population of the total populations PQ as $adj_{i,i+1}$, obtaining an adjacency matrix of an entire network as $$adj_j = \begin{pmatrix} adj_i & adj_{i,i+1} \\ adj_{i,i+1}^{T} & adj_{i+1} \end{pmatrix},$$

and obtaining, according to the adjacency matrix of the entire network, a first moment $\langle d_j \rangle$ and a second moment $\langle d_j^2 \rangle$ degree distribution to obtain an average path length of the entire network;

S7g, selecting a population $P_o$ corresponding to a minimum average path length of the network $\psi_a$ from the clonal populations Q, adding the population $P_o$ into the populations P, and deleting a population $P_b$ corresponding to a maximum average path length of the network $\psi_b$ from the populations P; and S7h, when $\psi_a \leq \psi$ is satisfied, $\psi=\psi_a$, and it=it+1, executing step S7c; otherwise, ending the loop, outputting the population $P_o$ corresponding to the minimum average path length of the network $\psi_a$, that is, the target inter-layer link set $\Phi=P_o$.

8. The inter-layer link design method of multilayer constellations as claimed in claim 7, wherein the randomly selecting a population $P_a$ in the total population PQ as a crossover population, and crossing all other populations with the population $P_a$ by using a single point crossover method, comprises:

randomly selecting a position in the population $P_a$ as a cross point, recording the cross point as g, recording populations other than the population $P_a$ as $P_c$, wherein $1 \leq g \leq 300$; and exchanging a first satellite to a $g^{th}$ satellite in a $s^{th}$ population in the populations $P_c$ with a first satellite to a $g^{th}$ satellite in the population $P_a$, wherein $1 \leq s \leq 149$.

9. The inter-layer link design method of multilayer constellations as claimed in claim 7, wherein step S7e comprises:

setting top markers of all satellites in the $i^{th}$ layer of satellite constellation in the $j^{th}$ population as a maximum comprehensive weight of the corresponding inter-layer links, and setting top markers of all satellites in the $(i+1)^{th}$ layer of satellite constellation in the $j^{th}$ population as 0; seeking a target marched set by using the Hungarian algorithm to make a sum of the comprehensive weights of all inter-layer links maximize, when the target marched set is not sought, sequentially modifying the top markers of the satellites in the $i^{th}$ layer of satellite constellation until the target marched set is sought; and obtaining the target marched set, and using the target marched set as the updated inter-layer link set of the $j^{th}$ population.

10. The inter-layer link design method of multilayer constellations as claimed in claim 7, wherein step S7f comprises:

S7f1, obtaining, according to the inter-layer topology and two intralayer topologies, the adjacency matrix of the entire network as $$adj_j = \begin{pmatrix} adj_i & adj_{i,i+1} \\ adj_{i,i+1}^T & adj_{i+1} \end{pmatrix},$$

making a degree of a $e^{th}$ satellite as $deg_e$, wherein a formula of the first moment of the degree distribution is expressed as follows:

$$\langle d_j \rangle = \frac{\sum_{e=1}^{N} deg_e}{N},$$

wherein $1 \leq e \leq N$;

S7f2, calculating the second moment of the degree distribution according to the first moment of the degree distribution, wherein a formula of the second moment of the degree distribution is expressed as follows:

$$\langle d_j^2 \rangle = \langle d_j \rangle^2 + \langle d_j \rangle;$$

S7f3, calculating the average path length of the entire network according to the first moment and the second moment of the degree distribution, wherein a formula of the average path length of the entire network is expressed as follows:

$$\psi_j = \frac{\ln(N/\langle d_j \rangle)}{\ln(\langle d_j^2 \rangle / \langle d_j \rangle)} + 1.$$

* * * * *